L. ALVERSON.
WIRE FENCE STAY MACHINE.
APPLICATION FILED JUNE 26, 1916.
1,264,746.
Patented Apr. 30, 1918.
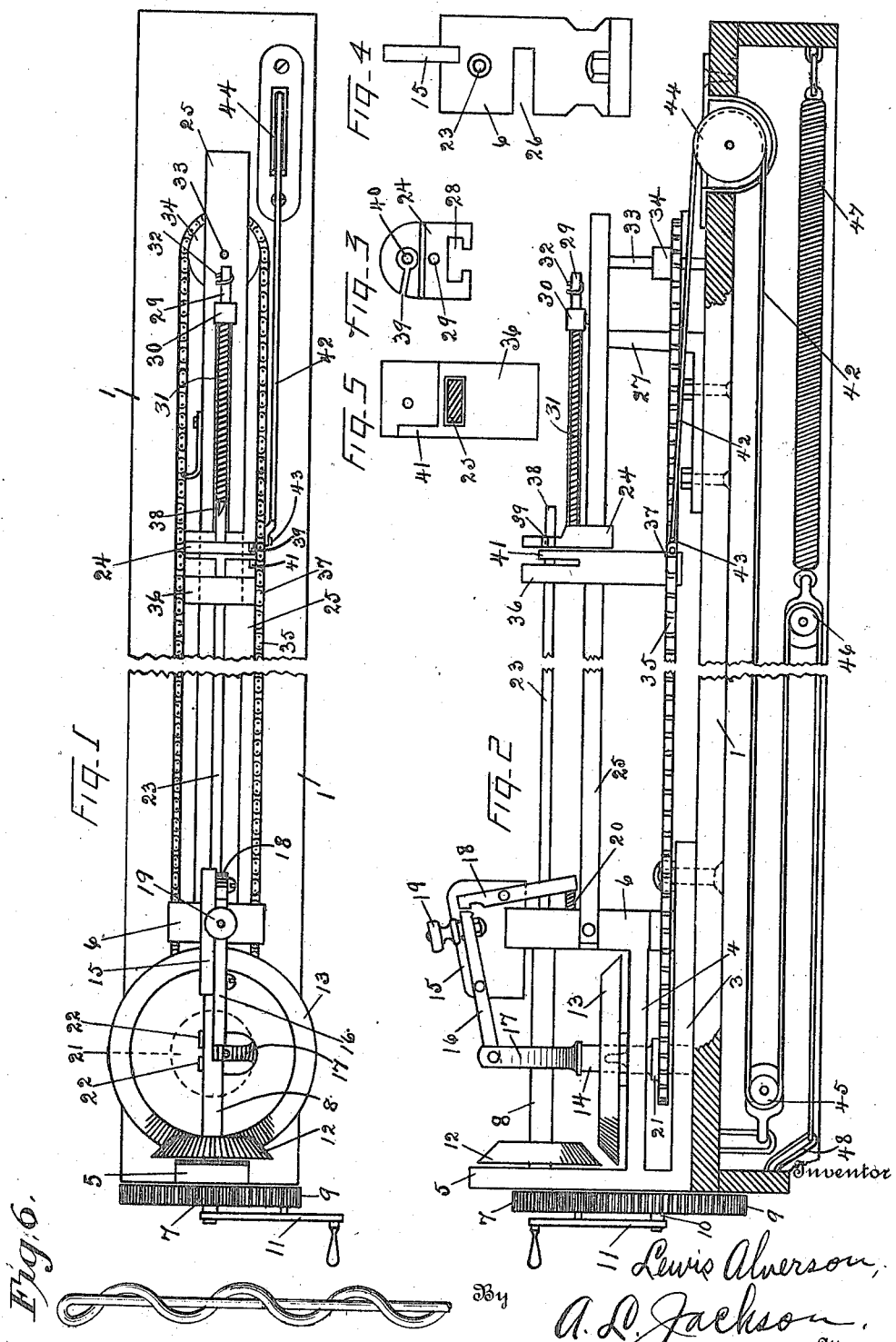

UNITED STATES PATENT OFFICE.

LEWIS ALVERSON, OF ABILENE, TEXAS, ASSIGNOR TO MARTIN O. SHOOP, OF ST. PAUL, MINNESOTA.

WIRE-FENCE-STAY MACHINE.

1,264,746. Specification of Letters Patent. Patented Apr. 30, 1918.

Application filed June 26, 1916. Serial No. 105,915.

*To all whom it may concern:*

Be it known that I, LEWIS ALVERSON, a citizen of the United States, residing at Abilene, in the county of Taylor and State of Texas, have invented certain new and useful Improvements in Wire-Fence-Stay Machines, of which the following is a specification.

My invention relates to wire working machines and more particularly to a machine for making wire fence stays; and the object is to provide a simple machine which will operate with certainty and precision and in which the most of the operations are automatic and on which the stay is completely formed and automatically discharged. A further object is to provide a machine which can be operated by manual power or any other suitable power. Another object is to provide a portable machine so that the machine may be carried from place to place and the fence stays manufactured wherever and whenever needed. Other objects and advantages will be fully explained in the following description and the invention will be more particularly pointed out in the claims.

Reference is had to the accompanying drawings which form a part of this application.

Figure 1 is a plan view of the machine. Fig. 2 is a side elevation of the same, the lower part of the frame being removed to show certain mechanism on the underside of the frame. Fig. 3 is a detail view of a guiding device and a buffer for aiding in discharging the wire stay after it is formed. Fig. 4 is a detail elevation of the casting on which the driving and other mechanism are mounted. Fig. 5 is an elevation of the tripper. Fig. 6 illustrates the kind of fence stay made by the machine herein set forth.

Similar characters of reference are used to indicate the same parts throughout the several views.

The machine is provided with a frame 1, which may be of wood, and which has an inverted box shape. A casting, having a base 3, is attached to the frame 1 and has a bearing bar 4 which is integral with two uprights 5 and 6. A pinion 7 is provided with a shaft 8 which is journaled in the uprights 5 and 6, the latter serving as a headstock for the guide bar 25. A cog wheel 9 is provided with a stub shaft 10 which is journaled in upright 5 and meshes with and drives the pinion 7. The cog wheel 10 may be driven by a crank 11 or other suitable power. The shaft 8 carries a beveled pinion 12 rigid therewith, which pinion may drive a beveled cog wheel 13 which is mounted on a spindle 14 which is journaled in the frame pieces 3 and 4 and is adapted to move freely therein. A fulcrum block 15, may be cast integral with the upright 6. The cog wheel 13 is thrown in mesh with the pinion 12 by means of a lever 16 which is fulcrumed on the block 15 and by a standard 17 to which the lever 16 is pivotally connected. The standard 17 is curved to pass below the shaft 8 and the lower end of the standard 17 is attached to the top of the spindle 14. The cog wheel 13 is held in mesh with the pinion 12 by a dog 18 which is pivotally mounted on the block 15. The lever 16 is pressed down by hand, the lever 16 being provided with a bearing knob 19, and the dog 18 engages the lever automatically. The dog 18 is made to engage the lever by a spring 20 which operates between the lower end of the dog 18 and the upright 6 and tends to hold the lower end of the dog 18 away from the upright 6. The tension of the spring 20 will hold the dog in engagement with the lever 16 until the dog is tripped. A sprocket wheel 21 is rigid with the spindle or shaft 14 and the standard 17 engages the upper end of the spindle 14 loosely so that the spindle can turn freely. The standard 17 has its end 22 forked to engage the spindle 14. The cog wheel 13 and sprocket wheel 21, being rigid with the shaft 14, are moved vertically at the same time by the standard 17. A hollow-shaft cylindrical former or mandrel 23 is rigidly connected and carried by the shaft 8 and serves for coiling one leg of the fence stay around the other leg, making a fence stay with one straight member and with the other member coiled about the straight member. A guide and buffer 24 supports in a loose manner the outer end of the shaft former 23. The opening 40 through the guide 24 must be large enough to receive the former 23 and the coiled leg of the stay which is coiled on the outside of the former 23. A horizontal bar 25 is mounted in the cut-out 26 in the upright 6 and is rigidly connected therewith, and at the other end of the bar it is attached to a bracket 27 which is bolted to the frame 1 and serves as a tail-stock. The bar 25 thus makes a rigid part of the frame. The guide 24 has an opening 28 to receive the bar 25 and in order to make the device 24 serve as a buffer for the tripper 36, a guide rod 29 is connected to the guide 24 rigidly and runs loosely through a guide stud 30 which is mounted on the bar 25. A spiral spring 31 is mounted on the guide rod 29 between the stud 30 and the guide or follower 24 to restore the guide to normal position after a buffing action, as hereinafter explained. A cotter pin 32 will prevent the guide rod 29 from leaving the guide stud 30. A vertical shaft 33 is journaled in the frame pieces 1 and 25 and carries a sprocket wheel 34 which is rigid therewith. A sprocket chain 35 is mounted on the sprocket wheels 21 and 34 and the wheel 21 drives the sprocket chain. A tripper or carriage 36 is loosely mounted on the bar 25 and moves back and forth thereon, the bar running through the tripper and serving as a guide means therefor. The sprocket chain 35 is attached to one side of the tripper, as at 37. In operation, the sprocket chain moves the tripper 36 back and forth on the bar 25. The forming shaft or mandrel 23 is cut out at the free end and a shoulder or bit 38 is formed at the end for engaging the wire and coiling one member of the wire on the outside of mandrel 23. The wire is inserted in the mandrel 23 and that part of the wire which is not inserted in the mandrel is bent back on the mandrel in the cut-out which forms the bit 38. A slot 39 is made in the guide 24 through which the bent wire can be brought close to the outside of the mandrel so that the wire and the mandrel will pass through the opening 40 in the guide. A lug or post 41 is provided on the tripper or carriage 36 and the bent wire is brought in between the lug 41 and the body of the tripper 36 and the free end of the wire is held against revolving with the mandrel 23. The lug 41 thus serves as an adjusting means for the wire as the tripper or forming die 36 moves forward. In operation, the bearing 19 is pressed down until the end of the lever 16 is engaged by the dog 18. This brings the bevel cog wheel 13 in mesh with the pinion 12 so that when the crank 11 is turned, the shaft 8 operates the mandrel and the pinion 12 drives cog wheel 13 and sprocket wheel 21 and the latter drives the sprocket chain 35. The sprocket chain 35 moves the tripper 36 until the tripper strikes the dog 18 and releases the lever 16 and thus unmeshes the cog wheel 13 from pinion 12. Means are provided for restoring the tripper to starting point automatically and to discharge the fence stay which is formed by the time the tripper strikes the dog 18. A tensioning mechanism is provided carrying the tripper back to normal position. The cog wheel 13, having been unmeshed from pinion 12, is free to turn in the opposite direction so that the cog wheel 13 and sprocket wheel 21 will be reversed and the tripper 36 will be returned to starting point, and will stop against the buffer 24, the momentum being sufficient to discharge the fence stay when the tripper 36 is arrested by the buffer. A cord or rope 42 is attached to the sprocket chain 35 at 43, thence run over a pulley 44, thence over a pulley 45 which is attached to frame 1, and thence over a pulley 46 which is attached to a spiral spring 47, and thence to a staple 48 driven into frame 1. One end of the spring 47 is attached to the frame 1. As the sprocket chain 35 is driven for the purpose of forming the fence stay and moves the tripper 36 to strike the dog 18, tension is created in the spring 47 which will draw the sprocket chain back to normal position as soon as the cog wheel 13 is released from pinion 12. This action will also discharge the fence stay and leave all parts in position to receive a new wire to form a new stay.

What I claim is:

1. A wire working machine having a tubular mandrel for receiving a wire, a traveling trip adapted to be reciprocated longitudinally on said mandrel and to hold the end of said wire against turning when the wire is bent back on the outside of said mandrel, said mandrel having a bit for holding the wire therein against turning, gearing for driving said mandrel and simultaneously moving said trip, and means mounted in the path of said trip and operated thereby to stop the action of the machine.

2. A wire working machine having a tubular mandrel for receiving a wire to form a stay, gearing and means for throwing said gearing and holding the same in operative relation for driving said mandrel, a trip adapted to move longitudinally on said mandrel and having provision for holding the free end of said wire against turning when bent back on the outside of said mandrel, said mandrel having a bit for gripping said wire while being driven, said trip being adapted to disconnect said gearing at the completion of the stay, and means for automatically returning said trip to starting point.

3. A wire working machine having a tubular mandrel to receive a wire to form a stay and provided with means for gripping the wire to revolve the same therewith, a gearing for revolving said mandrel, means for throwing and holding said gearing in operative relation, a trip adapted to move longitudinally on said mandrel and provided with means for holding the free end of said wire against turning when bent back on the outside of said mandrel, a track bar for said trip, a guide for said stay mounted on said track bar for coöperating with said trip for discharging the formed stay and serving as a buffer for said trip, means operatively connecting said trip to said gearing for moving the trip to coöperate in forming the stay and to cause said trip to disconnect said holding means on completion of the stay, and means for returning the trip to starting point.

4. A wire working machine comprising a base frame, a bearing frame attached thereto and provided with upright bearing members, a guide bar attached to said base frame and to one of said bearing members, a tubular mandrel journaled in said upright members and provided with a gear wheel, means for driving said gear wheel and revolving said mandrel, a trip-operating gearing including a gear wheel for intermittently engaging said first-mentioned gear wheel, holding mechanism for supporting said trip-operating gearing in operative position, a trip moving longitudinally on said bar and actuated by said trip-operating gearing for automatically releasing said holding mechanism, said mandrel having a bit formed thereon for holding the wire to coil the same on the outside of the mandrel while the mandrel is being driven, and said trip having provision for holding the end of the wire to be coiled about said mandrel while the mandrel is driven by said gearing until said trip stops said gearing.

5. In a fence stay machine, a tubular member adapted to receive internally one portion of a wire, means to rotate said member to coil externally the outer or other portion about said first portion to produce a stay, a carriage provided with means to adjust said outer portion of the wire in position to be coiled by said tubular member, guide means upon which said carriage is reciprocably mounted, and means for reciprocating the carriage on the guide means.

6. A stay machine comprising a base, a head-stock secured to the base, a tail-stock secured to the base, guide means extending between and supported in said head and tail stocks, a forming die slidably mounted on said guide means and having a hole therein, a cylindrical mandrel rotatably mounted in said head-stock and having a notched outer end extending through the opening in said die, means for positively moving said die forward on said mandrel, means for elastically returning said die, and means for rotating said mandrel during the forward movement of the die thereon.

7. A stay machine comprising a base, a head-stock secured to the base, a tail-stock secured to the base, guide means extending between and supported in said head and tail stocks, a forming die slidably mounted on said guide means and having a hole therein, a cylindrical mandrel rotatably mounted in said head-stock and having a notched outer end extending through the opening in said die, means for positively moving said die forward on said mandrel, means for elastically returning said die, means for rotating said mandrel during the forward movement of the die thereon, a follower on said guide means behind said die, means for elastically moving said follower forward with said die, and means for limiting the forward movement of said follower.

8. A stay machine comprising a base, a head-stock secured to said base, a tail-stock secured to said base, guide means extending between and fixed to said head and tail stocks, a forming die slidable on said guide means and having a hole extending therethrough, a follower on said guide means behind said die, said follower having an opening therethrough in alinement with the opening in said die, means for elastically moving said follower forward with the die, means for limiting said forward movement of the follower, a shaft mounted in said head-stock, a hollow mandrel secured to said shaft and having a notched end extending through the hole in said die, means for driving said shaft, driving means for positively moving said die forward on said mandrel, means operated by said die for releasing said driving means, and means for elastically returning said die after the release of said positive driving means.

In testimony whereof, I set my hand in the presence of two witnesses, this 24th day of April, 1915.

LEWIS ALVERSON.

Witnesses:
F. A. RANDALL,
DULIN O. LAPOUSEK.

Copies of this patent may be obtained for five cents each, by addressing the "Commissioner of Patents, Washington, D. C."